July 1, 1924.　　　W. W. McLAREN　　　1,499,835

AUTOMOBILE WHEEL

Filed July 8, 1922　　　2 Sheets-Sheet 1

W. W. McLaren,
Inventor

By C. A. Snow & Co.
Attorney

July 1, 1924.

W. W. McLAREN

AUTOMOBILE WHEEL

Filed July 8, 1922

1,499,835

2 Sheets-Sheet 2

W. W. McLaren,
Inventor

By C. A. Snow & Co.
Attorney

Patented July 1, 1924.

1,499,835

UNITED STATES PATENT OFFICE.

WILLIAM W. McLAREN, OF BIRMINGHAM, ALABAMA.

AUTOMOBILE WHEEL.

Application filed July 8, 1922. Serial No. 573,519.

*To all whom it may concern:*

Be it known that I, WILLIAM W. McLAREN, a citizen of the United States, residing at Birmingham, in the county of Jefferson and State of Alabama, have invented a new and useful Automobile Wheel, of which the following is a specification.

It is the object of this invention to provide a tire for a vehicle wheel, which will be resilient and inflatable, the construction of the device being such that puncture will be practically impossible.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown can be made without departing from the spirit of the invention.

In the accompanying drawings:—

Figure 1:
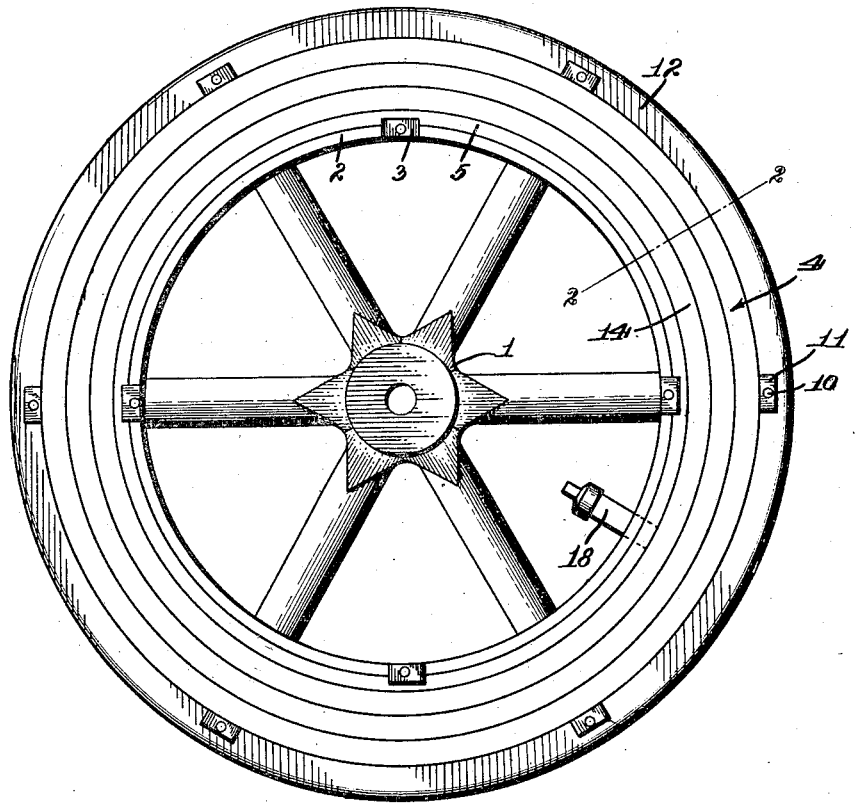
Figure 2:
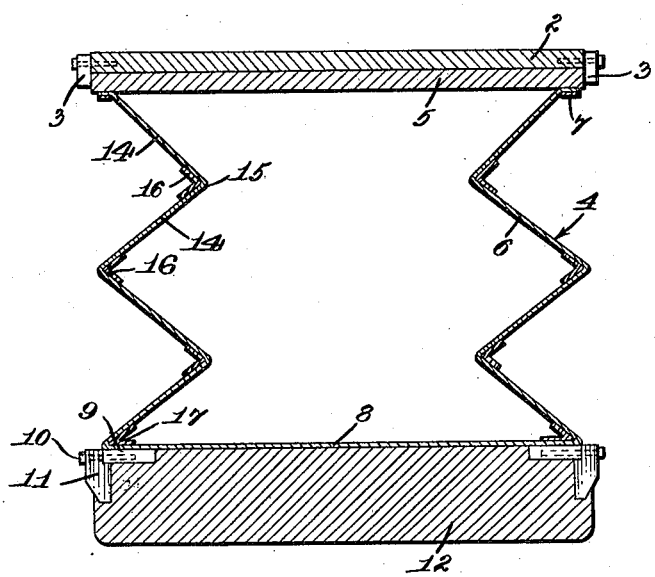
Figure 3:
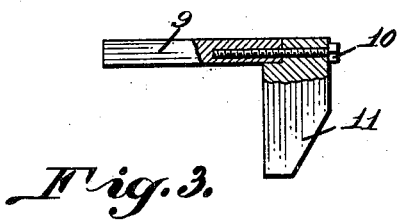

Figure 1 shows in elevation, a vehicle wheel equipped with the device constructed in accordance with the invention; Figure 2 is a cross section on the line 2—2 of Figure 1; Figure 3 is a detail showing the means for securing the tread on the inflatable body of the tire.

The numeral 1 marks a vehicle wheel provided with a rim 2 of any desired construction. The rim 2 carries clips 3 or the like, adapted to hold a tire 4 on the rim 2. The tire 4 includes a base 5 in the form of a ring, fitting closely about the rim 2. The tire 4 comprises foldable and flexible resilient side strips 6, which are made of metal, the strips being secured as indicated at 7 to the base ring 5. The side strips 6 are connected by an integrally formed annular outer member 8 carrying attaching pieces 9 wherein securing elements 10 are mounted, the same holding clips 11 which retain a tread 12 on the member 8. The tread may be of any desired construction, and solid rubber may be used in the making of the tread, if desired. The side strips 6 are folded circumferentially to form relatively inclined parts 14 defining angles 15 reinforced by metallic strips 16 which are in the form of angle members in cross section, the strips 16 being resilient. In a similar way, the body portion of the tire may be reinforced by strips 17 located in the angles formed by the outer member 8 and the adjacent parts of the body of the tire. Any suitable means 18 may be provided for securing an inflation of the tire.

After the tire has once been inflated, it will hold its air for a long time and cannot be punctured. The side strips 6 preferably have enough resiliency so that they will aid the contained air in supporting the weight. Should the tire become deflated, the parts 14 will fold toward each other, and some of the strain at the points of folding will be taken care of by means of the strips 16.

What is claimed is:—

A vehicle tire comprising an outer member and flexible metallic side strips formed integrally with the outer member, the side strips being folded circumferentially to define pronounced internal and external angles in the side strips, and to form angles at the places of juncture between the side strips and the outer member, angular reinforcing strips in all of said angles and located, alternately, within and without the tire, and a base whereunto the side strips are connected, the side strips forming the sole connections between the outer member and the base.

In testimony that I claim the foregoing as my own, I have hereto affixed my signature in the presence of two witnesses.

WILLIAM W. McLAREN.

Witnesses:
HERBERT I. BLISS,
Z. N. TOMLINSON.